(12) United States Patent
Xiong

(10) Patent No.: US 8,904,450 B2
(45) Date of Patent: Dec. 2, 2014

(54) INDIVIDUAL INTERNET VIDEO LINK CHANNEL

(75) Inventor: True Xiong, San Diego, CA (US)

(73) Assignee: Sony Corporation, Tokyo (JP)

( * ) Notice: Subject to any disclaimer, the term of this patent is extended or adjusted under 35 U.S.C. 154(b) by 915 days.

(21) Appl. No.: 12/657,061

(22) Filed: Jan. 13, 2010

(65) Prior Publication Data
US 2011/0088064 A1    Apr. 14, 2011

Related U.S. Application Data

(60) Provisional application No. 61/251,061, filed on Oct. 13, 2009.

(51) Int. Cl.
| | | |
|---|---|---|
| *H04N 5/445* | (2011.01) | |
| *H04N 7/18* | (2006.01) | |
| *H04N 7/173* | (2011.01) | |
| *H04N 21/2668* | (2011.01) | |
| *H04N 21/482* | (2011.01) | |
| *H04N 21/84* | (2011.01) | |

(52) U.S. Cl.
CPC ....... *H04N 7/17318* (2013.01); *H04N 21/2668* (2013.01); *H04N 21/4828* (2013.01); *H04N 21/84* (2013.01)
USPC ............... 725/81; 725/51; 725/52; 725/59; 725/61; 725/80; 725/87; 725/100

(58) Field of Classification Search
CPC .......... H04N 21/2665; H04N 21/4828; H04N 21/2668; H04N 7/17318; H04N 21/78; G06F 17/30867
USPC ................ 725/51, 80–85, 52, 60–62, 87, 100
See application file for complete search history.

(56) References Cited

U.S. PATENT DOCUMENTS

| | | | | |
|---|---|---|---|---|
| 2002/0144289 | A1* | 10/2002 | Taguchi et al. | 725/112 |
| 2004/0078812 | A1* | 4/2004 | Calvert | 725/46 |
| 2009/0094646 | A1 | 4/2009 | Walter et al. | |
| 2009/0282447 | A1 | 11/2009 | Mehta | |

OTHER PUBLICATIONS

Sony Electronics: news & information May 6, 2008.*

* cited by examiner

*Primary Examiner* — Pankaj Kumar
*Assistant Examiner* — Alazar Tilahun
(74) *Attorney, Agent, or Firm* — Miller Patent Services; Jerry A. Miller

(57) ABSTRACT

A system and method for establishing and provisioning a new Internet Video Link (IVL) category under user control and utilizing user requests for locating and including preferred video content. The new IVL category will include video content located on a local device as well as video content retrieved from any interne URL provided by a user. The IVL category is built in the background and contains a category as a directory of video content and channels as sub-directories containing subsets of the video content described by the category. The user may also input keywords for use in searching for preferred video content so as to establish a mix of video content concatenated into a single mix channel for use in viewing only those video content items associated with the keywords supplied by the user. Alternatively, the mix channel may be provisioned by locating and mixing together video content that has similar metadata tags associated with the user preferred video content. The user may also receive recommendations for IVL content from other users that is similar to the content preferred by the user. This abstract is not to be considered limiting, since other embodiments may deviate from the features described in this abstract.

24 Claims, 5 Drawing Sheets

INDIVIDUAL INTERNET VIDEO LINK CHANNEL

CROSS REFERENCE TO RELATED DOCUMENTS

This application is related to and claims priority benefit of U.S. Provisional Patent Application 61/251,061 filed Oct. 13, 2009 which is hereby incorporated herein by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

The internet has experienced an exponential growth of users due to the arrival of web 2.0. Web 2.0 is different from web 1.0 in many ways. One of the most distinctive difference is that web 2.0, for the first time, gives control to the users. This control enables user to generate and participate in the content creation and development of the internet. The users not only have control, but also ownership of their work.

As we move forward into an era of IPTV (Internet Protocol Television), this explosive growth of television viewers who are internet users are attempting to apply their internet experience to television viewing. As such, more users are coming to demand the experience in television viewing that they are used to on the internet, such as access to an ocean of digital media content.

Internet Video Link (IVL—for example Sony Corporation's commercially available BIVL™ or Bravia™ Internet Video Link, trademark of Sony Corporation) is a video streaming device that is able to connect to a multitude of servers in varying locations in order to provide television services via the internet. IVL provides a channel for the provisioning and enjoyment of internet television on any IVL capable video display device.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
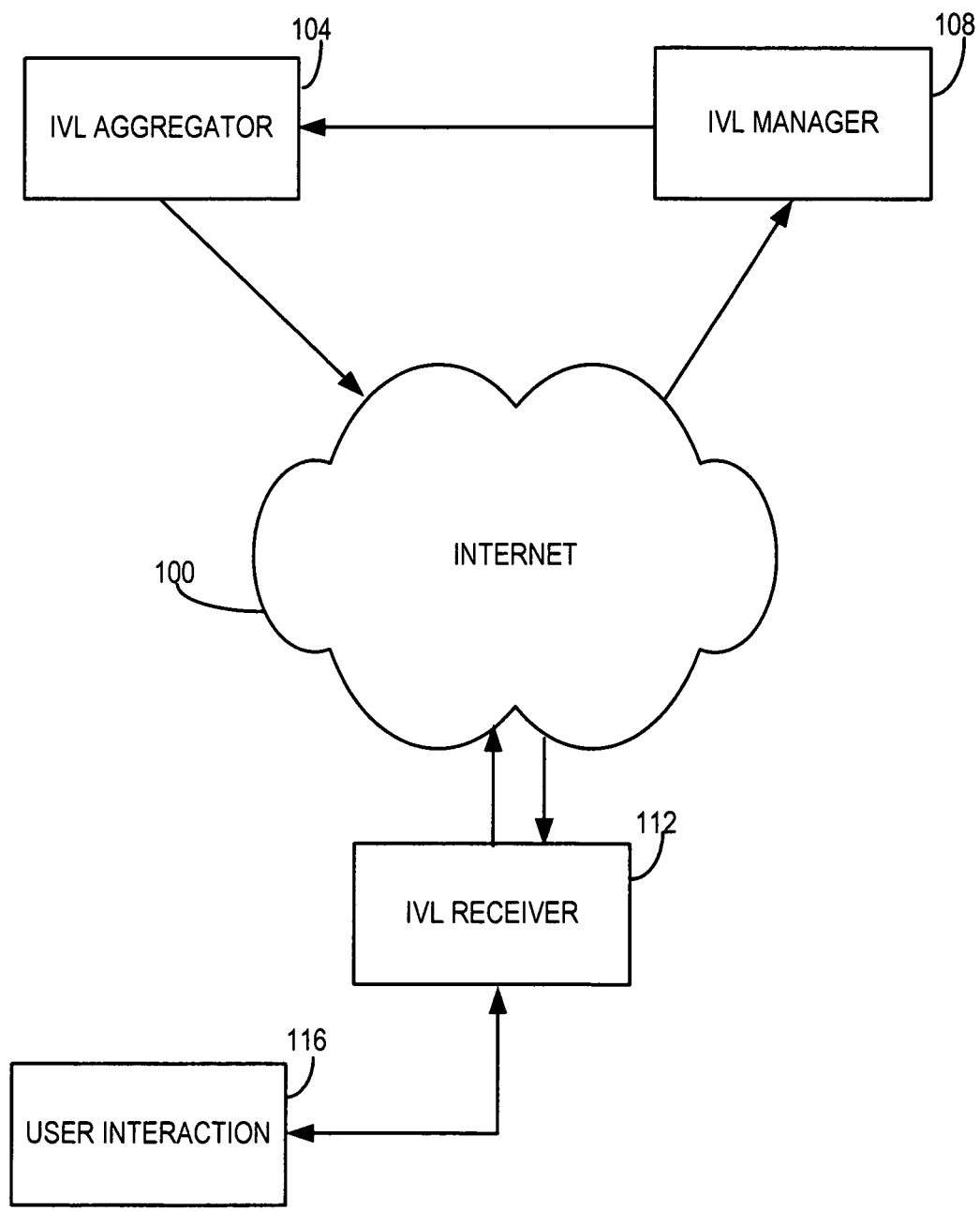
FIG. 1 is a diagram of an exemplary Internet Video Link service interaction consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", or "application" or "app" or the like may include a subroutine, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Software and/or firmware embodiments may be implemented using one or more programmed processors executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

Content may be embodied as any or all audio, video, multimedia or interactive data that may be encoded with entertainment, training, artistic, textual, or experimental subject matter that is created for playback in modes such as compact disc (CD), digital versatile disc (DVD), high definition DVD (HD-DVD), Blu-ray Disc (BD) of any suitable format, tape, Internet streams or downloads, handheld players, computer storage media or any other suitable playable modes.

The explosive growth of television viewing on the internet has given rise to the increasing presence of internet television capability in individual and group viewing locations, such as homes or bars that provide televised entertainment in non-limiting examples. As more users come to demand the video experience that they are accustomed to on the Internet, such as access to a tremendous variety and quantity of digital media content, the need for video entertainment devices that may present not only broadcast media entertainment but also digital video content from the Internet has become increasingly prevalent.

In an exemplary fashion one solution is to utilize the Television (TV) as the video entertainment display device and to open the TV to the world of internet digital content in the broadest manner possible. One of the issues with offering a robust internet communication experience on a television, even an HD television, is that historically a television is configured as a device into which content is received with limited capability to communicate from the television back to the broadcaster. Although television remote control devices are smart devices that can, and do, relay commands from a user through the television and back to the broadcaster of content, there is typically a very limited ability to such information as the URL of an internet location from which the user would like to receive content. To implement this type of function most efficiently would, in all likelihood, require the inclusion of an alphanumeric keyboard on the remote control device and would require users to upgrade both their existing remotes and the ability of the television set to collect and transmit alphanumeric information to a broadcaster.

In Sony's current (as of this writing) BIVL (Bravia Internet Video Link) enabled television sets, the internet content available is controlled by Sony's BIVL network which monitors content delivery quality and establishes menu entries on the television set (as described in U.S. patent application Ser. No. 12/151,619 filed May 8, 2008 to Mehta which is hereby incorporated by reference. This provides the user with a selection of television content from which the user can select desired programming from the list provided on the menu. No provision is currently available for direct entry of a URL or search keywords in the manner conventionally permitted by a web browser. Thus, the content available is limited in scope, but quality controlled.

Attempting to implement this type of functionality, which is very much like attaching computer input methodology to a television set, would require not only an investment by a broadcaster in new processors and information processing software, but would also require the users to upgrade television sets and remote controls to be able to use the new capabilities. Most users would be unwilling to replace a perfectly functioning television set and remote control simply to change the input capability when most of the content received by a user is deemed satisfactory. However, internet television capability is also deemed desirable by most users, as seen by the explosive growth of such websites as YouTube®, Hulu.com™, and website offerings of television programs from each of the major networks.

To provide users with a means of utilizing existing equipment, and thus saving the investment in existing television equipment, while presenting users with the rich content available on the internet is the goal of the internet television industry. A part of that solution is the creation of Internet Video Link service that presents the user with the ability to input an internet URL using existing television equipment through an Internet Video Link service presented to the user by the television content provider.

Implementing this service offering provides a way for users to create an Internet Video Link that creates a category for an internet service category and provisions subcategories of such service as channels in a dynamic, real-time manner. In a non-limiting example, one such service provider is the Bravia Internet Video Link (BIVL) offered to owners of Bravia brand TV devices manufactured by Sony. Currently, the BIVL service offered by Sony provides users with channels comprising digital content from the internet through the IPTV infrastructure on the Bravia TV device. The increased capability of the BIVL service provides the user with the control to configure and provision service channels for digital content that is of interest to the individual user, provide the option to view, mix, and compare such digital content, and yet continue to maintain the update, maintenance, presentation, and content provisioning with the Sony BIVL Service Manager.

Turning now to FIG. 1 (viewed in conjunction with FIG. 2), consistent with certain embodiments of the invention this figure presents an exemplary view of one possible system configuration for the IVL system. In this exemplary configuration, the Internet 100 is not only the pass through medium that provides for communication between any user interaction 116 at one end, and the IVL Manager 108 at the other end, but also the storehouse of much of the digital video content that is made available to the user at the video display device, such as a TV. The user submits requests and commands through user interaction 116 with an IVL receiver device 112 which may an integral component of a TV 216, such as, in a non-limiting example, the Bravia IVL, or a computer 204, game console 208, handheld device 212, or any other device that is utilized by a user as the display device for the digital content to be provided by the IVL. The IVL receiver 112 submits requests for channel and content provisioning and access to the IVL Manager 108 through an Internet 100 connection. The IVL Manager 108 is operative to communicate with an IVL Aggregator 104 to retrieve any desired content that has been communicated to a user as available for viewing. In addition, the IVL Manager 108 may issue commands to the IVL Receiver device 112 to search any file system maintained within the IVL Receiver device 112 to locate any folders containing digital video content that is specified by the user in any provisioning or update request.

Figure 2:
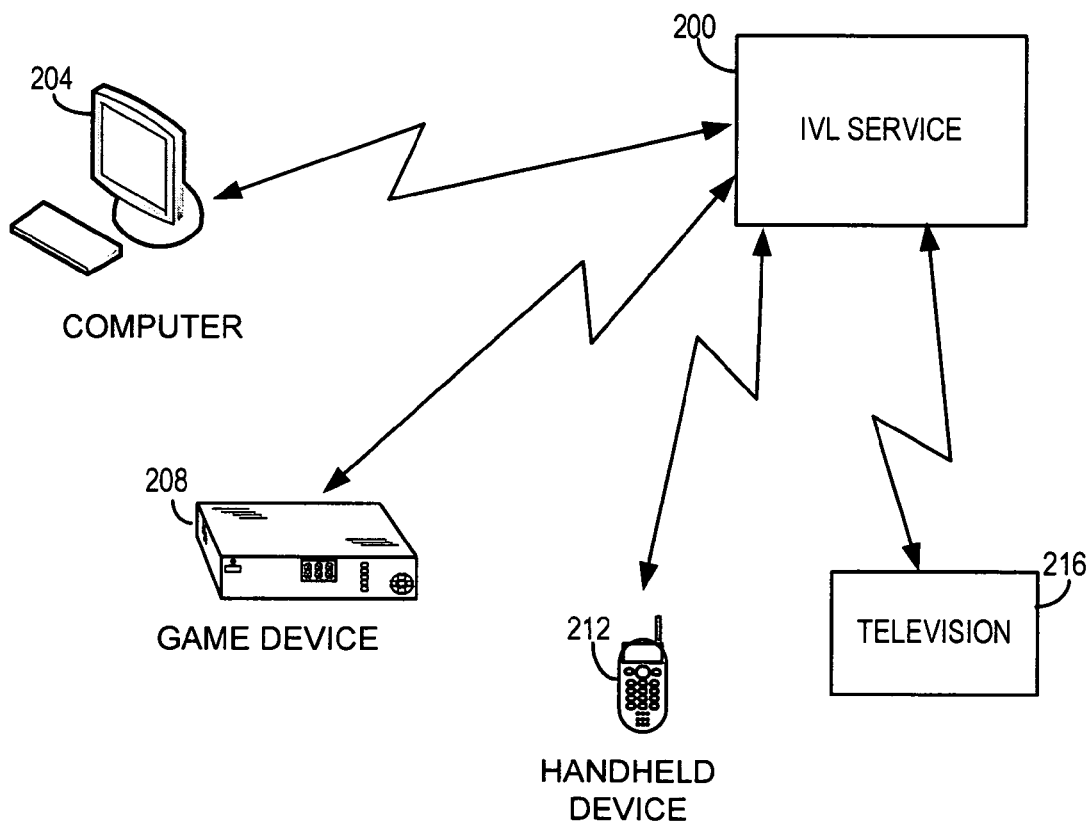
FIG. 2 is a diagram of exemplary input mechanisms for an Internet Video Link service consistent with certain embodiments of the present invention.

Turning now to FIG. 2, consistent with certain example embodiments of the invention this figure presents a diagram of exemplary input mechanisms for an IVL service. In an exemplary embodiment, the IVL Service 200, which comprises the IVL Aggregator 104 and IVL Manager 108, may be in communication with the user through any of a plurality of video display devices. These devices may include such devices as, in a non-limiting example, a Bravia brand TV 216, a computer 204, game console 208, handheld device 212, or any other device that is utilized by a user as the display device for the digital content to be provided by the IVL. The video display device is operative to communicate with the IVL Service to relay requests for IVL channel provisioning or updates to existing IVL categories or channels already available to the user.

Figure 3:
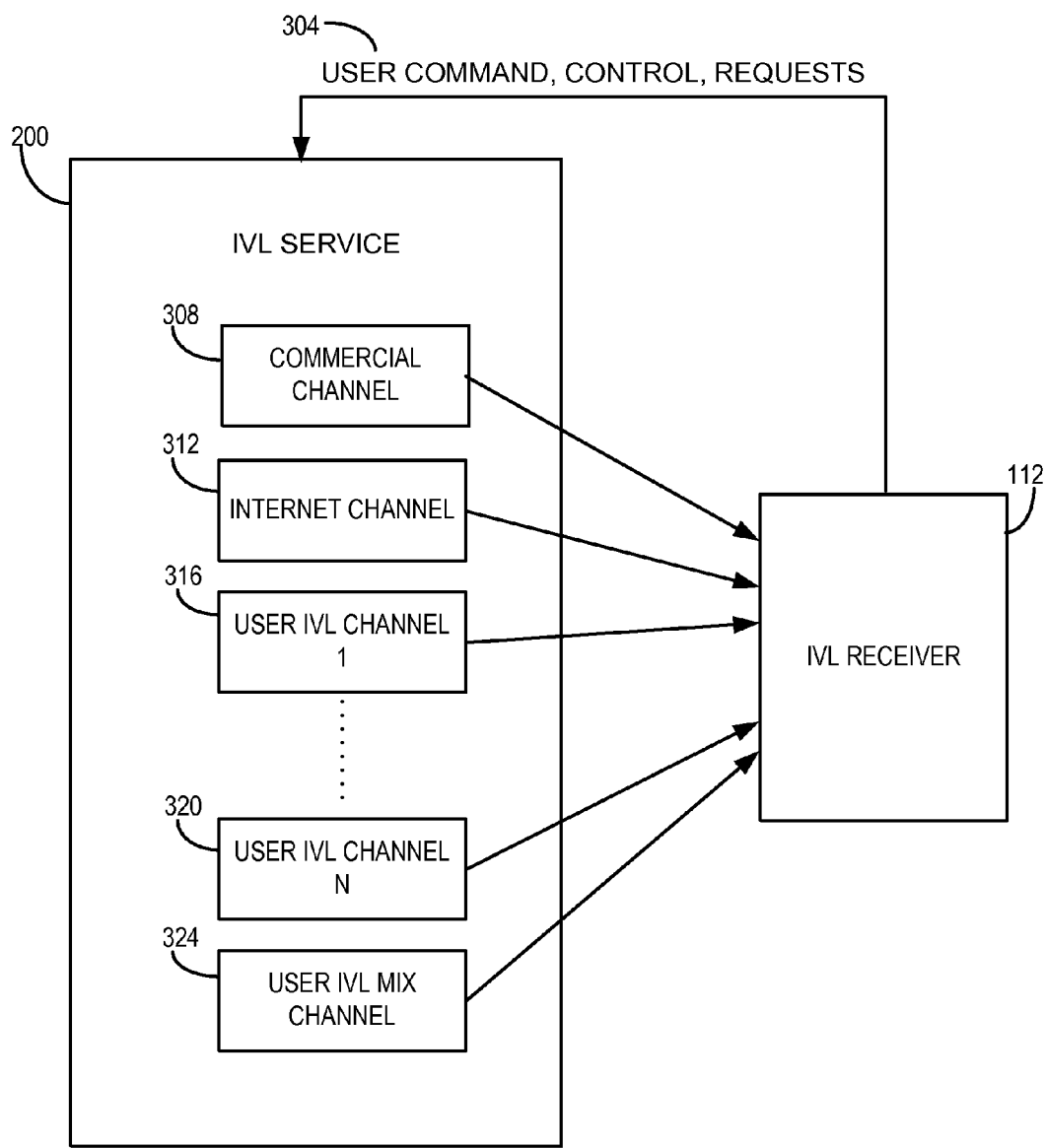
FIG. 3 is a diagram of an exemplary Internet Video Link service provision configuration consistent with certain embodiments of the present invention.

Turning to FIG. 3, an exemplary Internet Video Link service provision configuration is presented. In this exemplary diagram, the IVL Service 200 receives user commands, controls, and requests 304 from the IVL Receiver 112. In a non-limiting example, requests from the user may include requests for new categories of video entertainment content. The IVL Service 200 may provide, without any specific request or command from a user, both commercial 308 and internet channels 312 that are available from an IVL Aggregator 104 and these channels are provisioned and maintained by the IVL system for immediate use at the video display device (204, 208, 212, 216). The IVL Service 200 is also active to receive requests from a user to create and provision user specific content on a user channel such as user channel 1 316 created by the IVL Service for the user. Any of a plurality of user channels may be created as a result of requests by the user 304, such as user channels 1 316 through n 320. In an exemplary embodiment, the IVL Service 200 may also utilize metadata associated with an indicated category to create and provision a user IVL Mix channel 324. Such a user IVL Mix channel 324 will provide the creation of a sorted or categorized IVL content based upon preferred categories or keywords provided by a user. In this manner, the user IVL Mix channel 324 may present a "best-of" channel, or present a mix of video content that is specific to the interests of the user.

Figure 4:
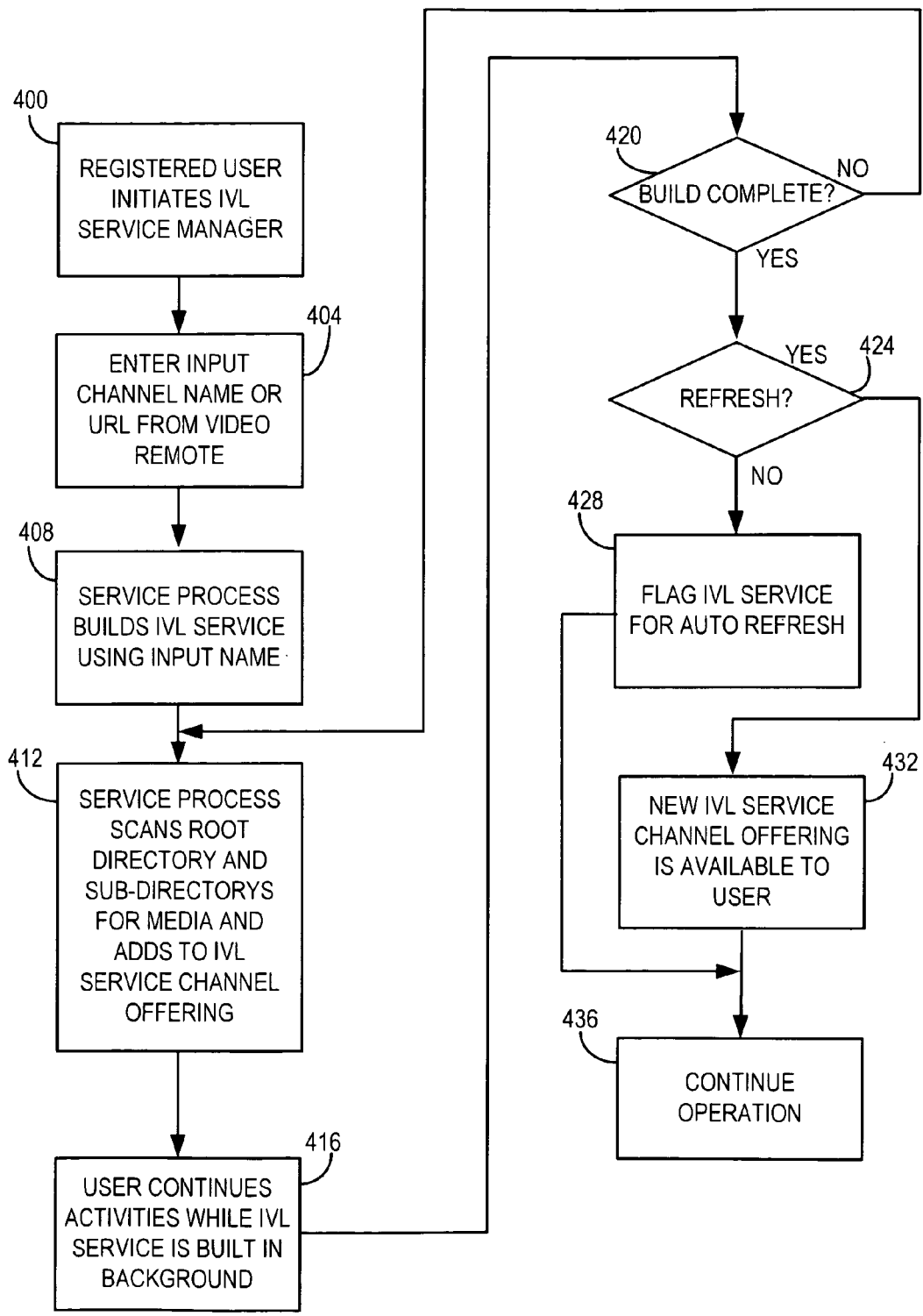
FIG. 4 is a flow diagram for depicting an illustrative process for establishing IVL service channel offerings available to a user consistent with certain embodiments of the present invention.

Turning now to FIG. 4, in an exemplary embodiment, the creation of a user requested IVL channel begins with a request from a registered user that initiates the IVL Service Manager 400. In a non-limiting example, the user may enter a channel or Internet domain name (URL) using the input mechanism associated with the video display device in use 404. Upon input of the channel or URL, the IVL Service Manager 400 initiates a background process that begins a scan of the root directory of the given domain for media content folder names or files 408. By way of example, a user may input the domain name "www.crunchyroll.com" as the desired location for media content. The IVL service background process may then build an IVL service category of "crunchyroll" and create subcategories for each media folder found at the URL 412. During this process, the user may continue to view any media content that was being displayed on the video display device as the service operates in the background to build both the category and channels associated with the user request 416.

The IVL service process determines whether the category build is complete 420 and, if completed, will prompt the user to submit a request to refresh the IVL service 424 in order to include the newly completed user category for availability to the user. If the build is not yet complete 420, the process will continue in the background until all content has been located and included in the category.

If the user chooses not to send a refresh IVL request, the IVL service will continue to provide the IVL channels currently available to the user 436 and set a flag to refresh the service selections the next time the service performs an automatic internet update 428. If the internet auto refresh has occurred, the new IVL Service channel offering is available to the user 432 and provides the user with the ability to view all categorized channel selections including the new IVL channels 436.

Figure 5:
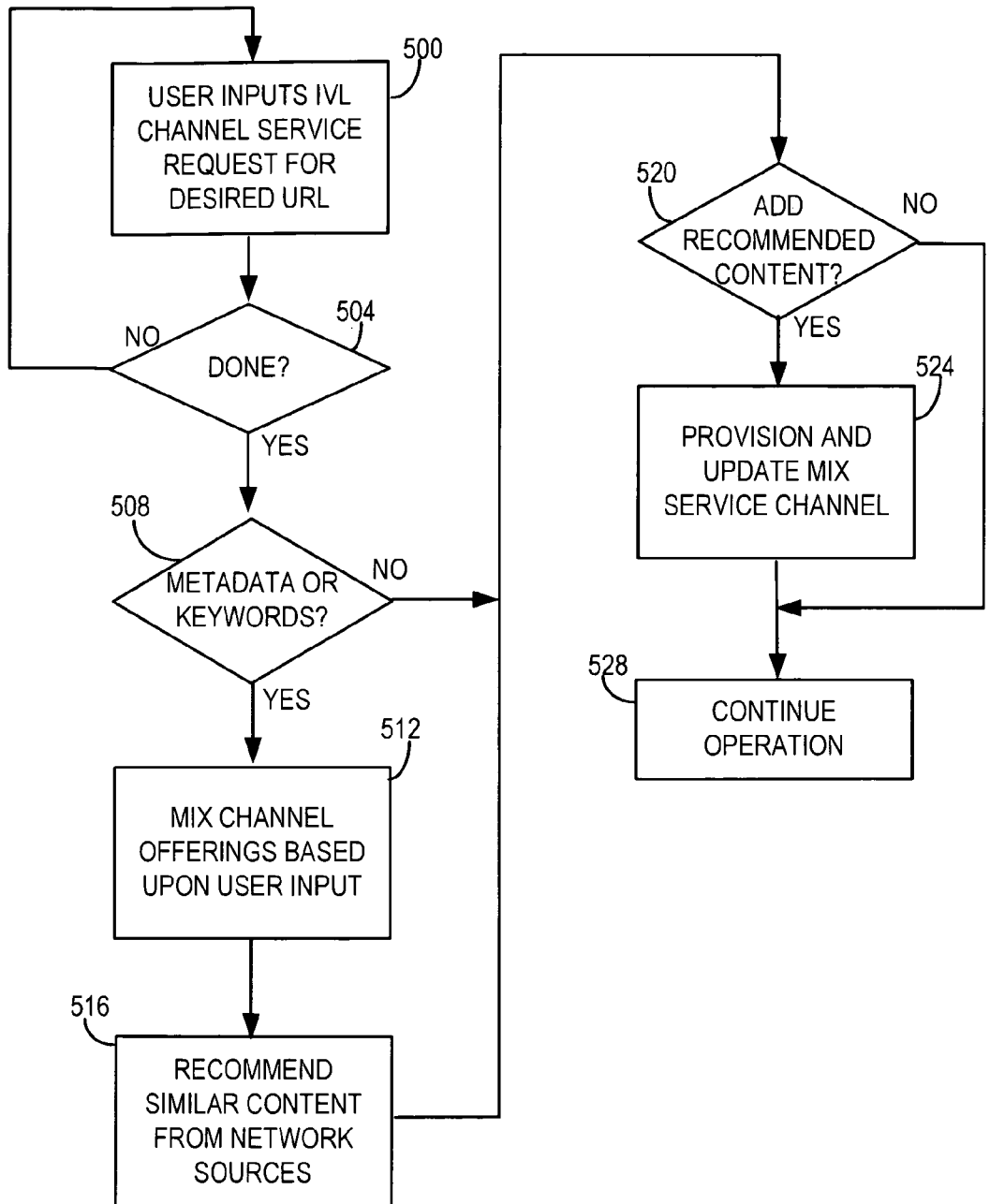
FIG. 5 is a flow diagram for depicting an illustrative process for establishing custom and mix IVL service channel offerings consistent with certain embodiments of the present invention.

Turning now to FIG. 5, in an exemplary embodiment, the user may also submit keywords after the creation of IVL service channels containing content of interest to the user. In this exemplary embodiment user a first inputs one or more IVL channel service requests 500 to create new or update existing IVL service channels. Once all requests for new IVL channels have been processed 504, the IVL Service Manager 108 determines whether the videos provisioned with each IVL channel have "category" metadata provided by a website that hosts the provisioned videos 508. This "category" metadata is characterized by folder structures into which the host website may have stored and referenced the video content. The IVL Service Manager 108 also determines whether the user has input "keywords" to associate the desired video content with the IVL channel 508. When the IVL Service Manager 108 determines that either "category" metadata or input user "keywords" is available, the retrieved video content is sorted and used to create a mix channel of offerings based upon the preferred metadata categories or user keyword input 512.

Also, in an exemplary embodiment, the IVL Service 200 may recommend video content to a user that is similar to that content that is provisioned in one or more mix IVL channels 516. In a non-limiting example, the recommendation of content may be implemented by having user A creating a BIVL video service based on a URL domain name (ie: crunchyroll.com), the harvested metadata such as categories (drama, action, Korean, etc) and entered "key words" will be stored into a database. After use A has completed this action a new user B may create a different BIVL video service based on a URL domain name that has similar videos based on category metadata or keywords similar to crunchyroll.com. The BIVL video will create a "recommendation message" that will appear to user A suggesting a similar, already-existing BIVL video list and its URL domain crunchyroll.com with an option to add the channel 520. With social networking incorporation in the IVL service offering, user a can share his/her created BIVL list to the world after it has been created. User A can limit or restrict sharing of his/her newly created BIVL video service. When user B see this recommendation message, user B may simply select that BIVL video service by user A from a list of similar user-created BIVL services and is automatically added to his/her BIVL list on the next "Internet Refresh" from the TV 524. User B may also rate the BIVL video service created by user A with a rating system in which the higher the number of stars given by user B the higher user B recommends this BIVL video service created by user A. The system may then refresh automatically and continue operation 528.

In one embodiment consistent with the present invention a method and system for a method of establishing an Internet Video Link (IVL) service category in which a user request is communicated to an IVL service manager to create a new service category at the user site by entering a service category name or User Resource Locator (URL) via an input device associated with a video display device controlled by the user. The service provider then may establish the new service category as a background process wherein the new service category is created using the input service category name or URL and provision the new service category with video content from user local and internet sources of video content. The IVL service may then refresh the IVL service automatically to include access to the new IVL service category on the user video display device.

In an additional embodiment consistent with the present invention the service category may comprise a directory and sub-directory hierarchy for provisioning the requested video content in this hierarchical fashion. Additionally, the creation and maintenance of the IVL service category for each user is provided by an IVL service provider where the service provider may be the Bravia™ IVL service. The user may also input keywords for use in searching for video content associated with each keyword, and the search for video content will include the internet, directories on local user storage devices, and other provisioned IVL categories. The video content data from all internet, local, and previously provisioned IVL categories may be mixed together to form a separate mix IVL category consistent with input user keywords, and the IVL service provider utilizes metadata associated with requested internet video content sources to establish a user preferred category of video content. The video content data consistent with a user preferred category of video content from all internet, local, and previously provisioned IVL categories is mixed together to form a separate mix IVL category consistent with the established user preferred category. The video display device at the user location may comprise any of a television, computer monitor, game console, or handheld device. In addition, the IVL category may be associated with an Internet URL or computer system folder, and sub-directories may be associated with IVL channels.

Thus, a method for establishing an Internet Video Link (IVL) service category involves communicating a user request to an IVL service manager to create a new service category at the user site; entering a service category name or User Resource Locator (URL) via an input device associated with a video display device controlled by the user; establishing the new service category as a background process wherein the new service category is created using the input service category name or URL; provisioning the new service category with video content from user local and internet sources of video content; and refreshing the IVL service automatically to include access to the new IVL service category on the user video display device.

In certain implementations, the service category comprises a directory and sub-directory hierarchy for provisioning the requested video content. In certain implementations, the creation and maintenance of the IVL service category for each user is provided by an IVL service provider. In certain implementations, the IVL service provider comprises at least the Bravia IVL service. In certain implementations, the user may input keywords for use in searching for video content associated with each keyword, and wherein the search for video content comprises the internet, directories on local user storage devices, and other provisioned IVL categories. In certain implementations, video content data from all internet, local, and previously provisioned IVL categories is mixed together to form a separate mix IVL category consistent with input user keywords. In certain implementations, the IVL service provider utilizes metadata associated with requested internet video content sources to establish a user preferred category of video content. In certain implementations, video content data consistent with a user preferred category of video content from all internet, local, and previously provisioned IVL categories is mixed together to form a separate mix IVL category consistent with the established user preferred category. In certain implementations, the video display device comprises any of a television, computer monitor, game console, or handheld device. In certain implementations, the IVL category is associated with an Internet URL or computer system folder and sub-directories are associated with IVL channels.

An example system for establishing an Internet Video Link (IVL) service category has a processor for communicating a user request to an IVL service manager to create a new service category at the user site. A video display device is controlled by a user, wherein the user enters a service category name or User Resource Locator (URL) via an input device associated with the video display device. A processor is operative to instantiate a background process to establish the new service category created using the input service category name or URL. The processor is also operative to provision the new service category with video content from user local and internet sources of video content. The video display device provides access to the new IVL service category after an automatic refresh action by the processor to present the new IVL service category to the user.

In certain implementations, the new service category comprises a directory and sub-directory hierarchy for provisioning the requested video content. In certain implementations, the creation and maintenance of the IVL service category for each user is provided by an IVL service provider server. In certain implementations, the IVL service provider comprises at least the Bravia IVL service. In certain implementations, the user may input keywords using an input device associated with a user video display device for use in searching for video content associated with each keyword, and wherein the search for video content comprises the internet, directories on local user storage devices, and other provisioned IVL categories. In certain implementations, video content data from all internet, local, and previously provisioned IVL categories is mixed together to form a separate mix IVL category consistent with input user keywords. In certain implementations, the IVL service provider utilizes metadata associated with requested internet video content sources to establish a user preferred category of video content. In certain implementations, video content data consistent with a user preferred category of video content from all internet, local, and previously provisioned IVL categories is mixed together to form a separate mix IVL category consistent with the established user preferred category. In certain implementations, the video display device comprises any of a television, computer monitor, game console, or handheld device. In certain implementations, the IVL category is associated with an Internet URL or computer system folder and sub-directories are associated with IVL channels.

A computer readable storage medium consistent with certain implementations stores instructions which, when executed on one or more programmed processors, carry out a process for establishing an Internet Video Link (IVL) service category, where the instructions call for communicating a user request to an IVL service manager to create a new service category at the user site; entering a service category name or User Resource Locator (URL) via an input device associated with a video display device controlled by the user; establishing the new service category as a background process wherein the new service category is created using the input service category name or URL; provisioning the new service category with video content from user local and internet sources of video content; and refreshing the IVL service automatically to include access to the new IVL service category on the user video display device.

In certain implementations, the service category comprises a directory and sub-directory hierarchy for provisioning the requested video content. In certain implementations, the creation and maintenance of the IVL service category for each user is provided by an IVL service provider. In certain implementations, the IVL service provider comprises at least the Bravia™ IVL service. In certain implementations, the user may input keywords for use in searching for video content associated with each keyword, and wherein the search for video content comprises the internet, directories on local user storage devices, and other provisioned IVL categories. In certain implementations, video content data from all internet, local, and previously provisioned IVL categories is mixed together to form a separate mix IVL category consistent with input user keywords. In certain implementations, the IVL service provider utilizes metadata associated with requested internet video content sources to establish a user preferred category of video content. In certain implementations, video content data consistent with a user preferred category of video content from all internet, local, and previously provisioned IVL categories is mixed together to form a separate mix IVL category consistent with the established user preferred category. In certain implementations, the video display device comprises any of a television, computer monitor, game console, or handheld device. In certain implementations, the IVL category is associated with an Internet URL or computer system folder, and sub-directories are associated with IVL channels.

While certain illustrative embodiments have been described, it is evident that many alternatives, modifications, permutations and variations will become apparent to those skilled in the art in light of the foregoing description.

What is claimed is:

1. A method for establishing an Internet Video Link (IVL) service category comprising:
   communicating a user request from a user device over an Internet connection to an IVL service manager to create a new service category at a user site;
   entering a service category name or User Resource Locator (URL) via an input device associated with a video display device controlled by the user at the user site;
   at the IVL service manager, establishing the new service category as a background process wherein the new service category is created using the input service category name or URL;
   wherein the creation and maintenance of the IVL service category for each user is provided by an IVL service provider;
   wherein said IVL service provider comprises at least a Bravia IVL service;
   the IVL service manager provisioning the new service category with video content from user local and internet sources of video content by instructing a content aggregator to aggregate the video content; and
   refreshing the IVL service automatically to include access to the new IVL service category on the user video display device.

2. A method as in claim 1 wherein the service category comprises a directory and sub-directory hierarchy for provisioning the requested video content.

3. A method as in claim 1 wherein the user may input keywords for use in searching for video content associated with each keyword, and
   wherein the search for video content comprises the internet, directories on local user storage devices, and other provisioned IVL categories.

4. A method as in claim 3 wherein video content data from all internet, local, and previously provisioned IVL categories is mixed together to form a separate mix IVL category consistent with input user keywords.

5. A method as in claim 1 wherein the IVL service provider utilizes metadata associated with requested internet video content sources to establish a user preferred category of video content.

6. A method as in claim 5 wherein video content data consistent with a user preferred category of video content from all internet, local, and previously provisioned IVL categories is mixed together to form a separate mix IVL category consistent with the established user preferred category.

7. A method as in claim 1 wherein the video display device comprises any of a television, computer monitor, game console, or handheld device.

8. A method as in claim 2 wherein the IVL category is associated with an Internet URL or computer system folder and sub-directories are associated with IVL channels.

9. A system for establishing an Internet Video Link (IVL) service category, comprising:
   a processor for communicating a user request from a user device over an Internet connection to an IVL service manager to create a new service category at a user site;
   a video display device controlled by a user at the user site, wherein the user enters a service category name or User Resource Locator (URL) via an input device associated with the video display device;
   the processor operative to instantiate a background process at the IVL service manager to establish the new service category created using the input service category name or URL;
   wherein the creation and maintenance of the IVL service category for each user is provided by an IVL service provider;
   wherein said IVL service provider comprises at least a Bravia IVL service;
   the processor also operative to cause the IVL service manager to provision the new service category with video content from user local and internet sources of video content by instructing a content aggregator to aggregate the video content; and
   the video display device providing access to the new IVL service category after an automatic refresh action by the processor to present the new IVL service category to the user.

10. A system as in claim 9 wherein the new service category comprises a directory and sub-directory hierarchy for provisioning the requested video content.

11. A system as in claim 9 wherein the user may input keywords using an input device associated with a user video display device for use in searching for video content associated with each keyword, and wherein the search for video content comprises the internet, directories on local user storage devices, and other provisioned IVL categories.

12. A system as in claim 11 wherein video content data from all internet, local, and previously provisioned IVL categories is mixed together to form a separate mix IVL category consistent with input user keywords.

13. A system as in claim 9 wherein the IVL service provider utilizes metadata associated with requested internet video content sources to establish a user preferred category of video content.

14. A system as in claim 13 wherein video content data consistent with a user preferred category of video content from all internet, local, and previously provisioned IVL categories is mixed together to form a separate mix IVL category consistent with the established user preferred category.

15. A system as in claim 9 wherein the video display device comprises any of a television, computer monitor, game console, or handheld device.

16. A system as in claim 10 wherein the IVL category is associated with an Internet URL or computer system folder and sub-directories are associated with IVL channels.

17. A non-transitory computer readable storage medium storing instructions which, when executed on one or more programmed processors, carry out a process for establishing an Internet Video Link (IVL) service category comprising:
   communicating a user request from a user device over an Internet connection to an IVL service manager to create a new service category at a user site;

wherein the creation and maintenance of the IVL service category for each user is provided by an IVL service provider;

wherein said IVL service provider comprises at least a Bravia IVL service;

entering a service category name or User Resource Locator (URL) via an input device associated with a video display device controlled by the user at the user site;

at the IVL service manager, establishing the new service category as a background process wherein the new service category is created using the input service category name or URL;

the IVL service manager provisioning the new service category with video content from user local and internet sources of video content by instructing a content aggregator to aggregate the video content; and refreshing the IVL service automatically to include access to the new IVL service category on the user video display device.

18. A non-transitory computer readable storage medium as in claim 17 wherein the service category comprises a directory and sub-directory hierarchy for provisioning the requested video content.

19. A non-transitory computer readable storage medium as in claim 17 wherein the user may input keywords for use in searching for video content associated with each keyword, and wherein the search for video content comprises the internet, directories on local user storage devices, and other provisioned IVL categories.

20. A non-transitory computer readable storage medium as in claim 19 wherein video content data from all internet, local, and previously provisioned IVL categories is mixed together to form a separate mix IVL category consistent with input user keywords.

21. A non-transitory computer readable storage medium as in claim 17 wherein the IVL service provider utilizes metadata associated with requested internet video content sources to establish a user preferred category of video content.

22. A non-transitory computer readable storage medium as in claim 21 wherein video content data consistent with a user preferred category of video content from all internet, local, and previously provisioned IVL categories is mixed together to form a separate mix IVL category consistent with the established user preferred category.

23. A non-transitory computer readable storage medium as in claim 17 wherein the video display device comprises any of a television, computer monitor, game console, or handheld device.

24. A non-transitory computer readable storage medium as in claim 18 wherein the IVL category is associated with an Internet URL or computer system folder, and sub-directories are associated with IVL channels.

* * * * *